Oct. 16, 1934.  F. H. McCORMICK  1,977,393
TEMPERATURE CONTROL DEVICE
Filed Nov. 17, 1931  2 Sheets-Sheet 1
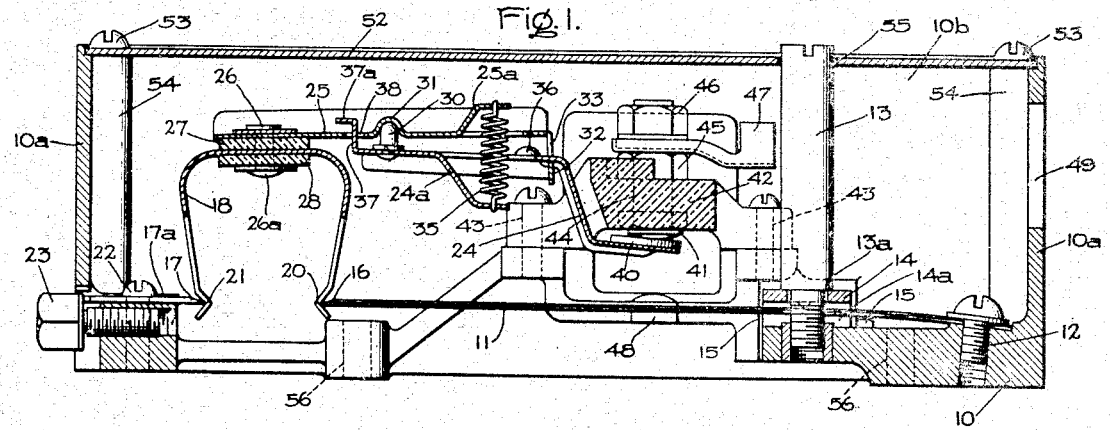
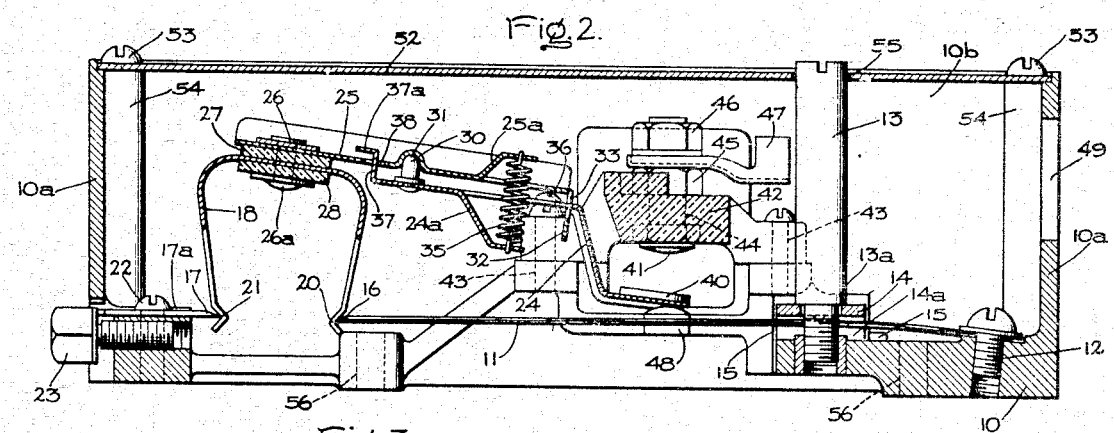
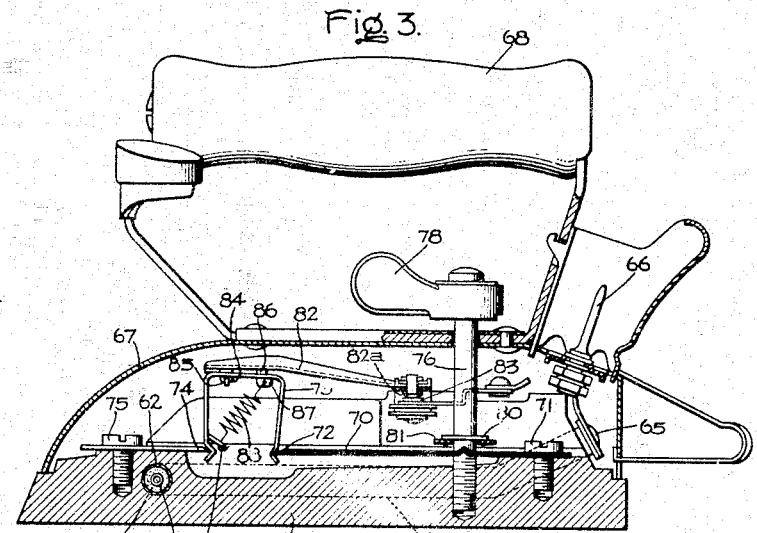
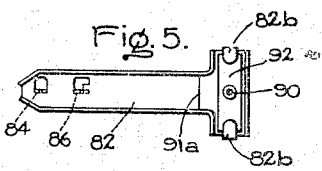
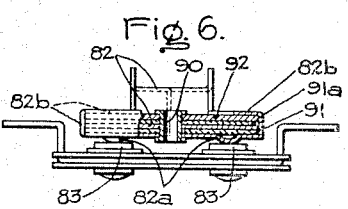
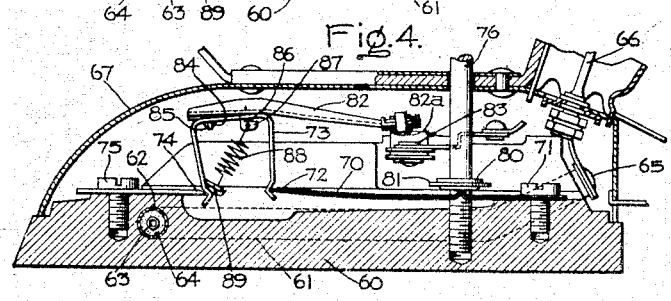
Inventor:
Francis H. McCormick,
by Charles V. Tullar
His Attorney.

Oct. 16, 1934.                F. H. McCORMICK                1,977,393
                         TEMPERATURE CONTROL DEVICE
                           Filed Nov. 17, 1931            2 Sheets-Sheet 2
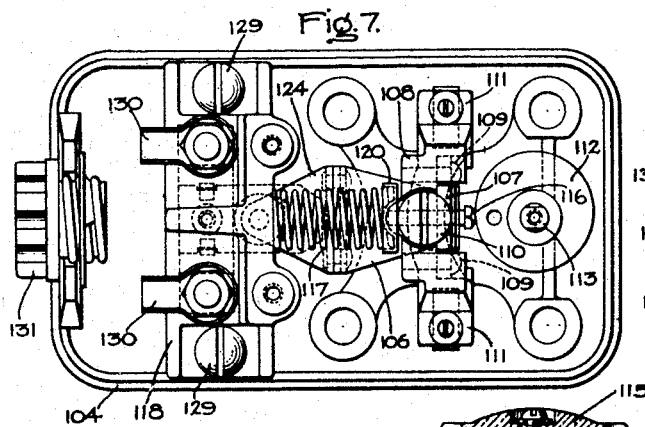
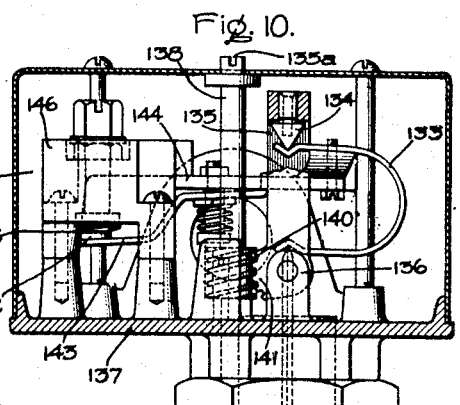
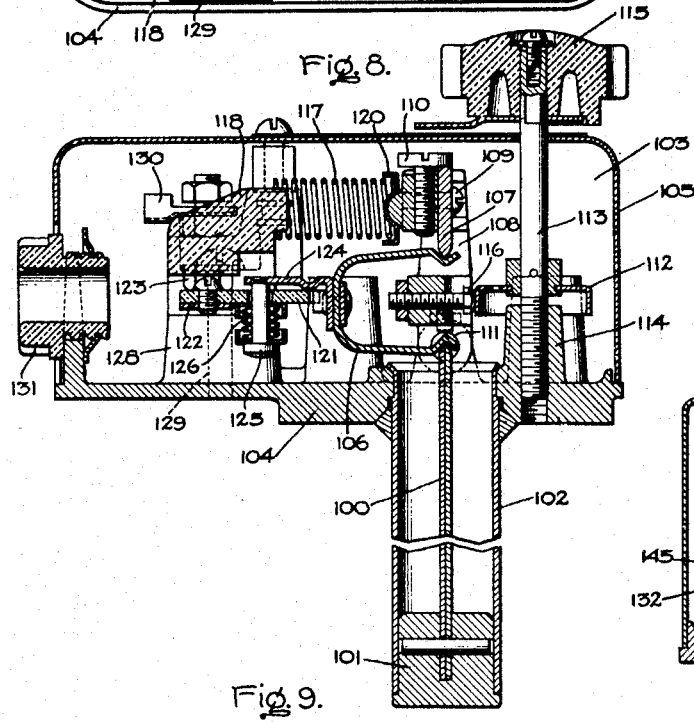
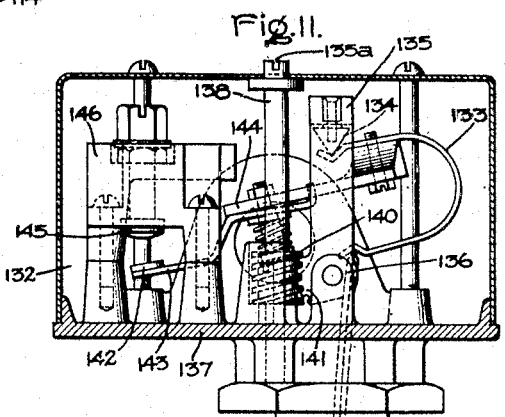
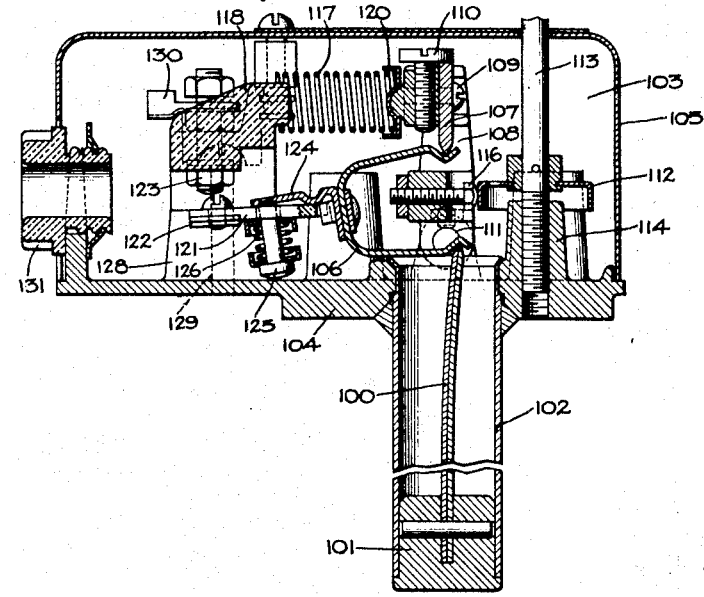
Inventor:
Francis H. McCormick,
by 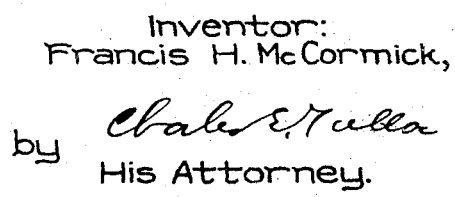
His Attorney.

Patented Oct. 16, 1934

1,977,393

UNITED STATES PATENT OFFICE 1,977,393

TEMPERATURE CONTROL DEVICE

Francis H. McCormick, Glen Ellyn, Ill., assignor to General Electric Company, a corporation of New York Application November 17, 1931, Serial No. 575,593

3 Claims. (Cl. 200—139)

My invention relates to temperature control devices, more particularly to devices for controlling an electric circuit in accordance with temperature changes, and has for its object the provision of an improved device of this character.

In general my invention relates to temperature responsive devices such as described and claimed in U. S. reissue patent to A. Lewerenz, No. 16,654, dated June 14, 1927, and more specifically relates to improvements in the temperature control device described and claimed in U. S. patent to A. H. Simmons, No. 1,743,073, dated January 7, 1930. The temperature control devices disclosed in these patents comprise a bimetallic thermostat bar fixed at one end and having its other end free to move in response to changes in temperature. These movements of the bimetallic bar are utilized to control a switch arm or other suitable control member. Bearing on the movable end of the bimetallic bar is an elastic member arranged to cause the bar to move quickly from one position to another and thereby give the switch a snap action in opening and closing the circuit which it controls.

My invention contemplates the provision of improved operable connection means between the switching means and the bimetallic thermostat bar, whereby a more rugged, and hence, a more reliable and efficient device is obtained.

My invention further contemplates the provision of improved means for adjusting the temperature setting of the temperature responsive device.

In carrying out my invention, I provide a bimetallic thermostat bar having one of its ends fixed and its other end movable laterally in response to changes in temperature. An elastic member is arranged to apply a force to the movable end of the bar so as to cause the bar to move quickly from one position to another. I further provide a comparatively rigid and mechanically strong switch control arm, and arrange a loose connection between the control arm and the bimetallic thermostat bar whereby these members have limited freedom of movement with respect to each other. Preferably, suitable elastic means will be provided for biasing the control arm to its switch closing position. By reason of the foregoing arrangement the bimetallic bar in its switch opening movement will acquire considerable velocity before the contact arm is actuated to open the switch.

In order to adjust the temperature setting of the control device in accordance with one form of my invention, suitable means are provided for changing the position of the elastic member bearing on the movable end of the bimetallic thermostat bar.

For a more complete understanding of my invention, reference should be had to the accompanying drawings in which Fig. 1 is a vertical central sectional view of a temperature control device embodying my invention; Fig. 2 is a view similar to Fig. 1, but illustrating certain elements of the control device in different operative positions than they occupy in Fig. 1; Fig. 3 is a vertical elevation mainly in section illustrating a modified form of my invention as applied to control the heating circuit of an electrically heated flat iron; Fig. 4 is a fragmentary view in section illustrating certain of the elements of the control device of Fig. 3, but in different operative positions; Fig. 5 is a plan view of the switch control arm used in the control device of Figs. 3 and 4; Fig. 6 is a view in elevation illustrating switch contacts used in the control device of Figs. 3 and 4, parts being shown in section so as to illustrate certain structural details; Fig. 7 is a plan view of another modified form of my invention; Fig. 8 is a vertical central sectional view of the temperature control device of Fig. 7, portions being broken away; Fig. 9 is a view similar to Fig. 8, but illustrating certain elements of the device in different operative positions than they occupy in Fig. 8; Fig. 10 is an elevation partly in section of still another modified form of my invention, parts being broken away; and Fig. 11 is a view similar to Fig. 10, but illustrating certain elements of the device in different operative positions than they occupy in Fig. 10.

Referring more particularly to Figs. 1 and 2, I have shown my invention in one form as applied to a temperature responsive device intended to be used to control rather large currents, such as those encountered in hot water heating systems. As shown, the temperature control device comprises a base or supporting member 10 formed from a suitable metallic material, such as aluminum. The base 10 is provided with integral end and side walls 10a and 10b rising vertically therefrom and defining a casing.

A suitable thermostat shown as a bimetallic bar 11 made of two strips of metal having dissimilar temperature coefficients of expansion, such as brass and steel, the strips being securely brazed or welded together lengthwise, is mounted on the support 10. The bar 11 is rigidly secured at one end to the support 10 by means of clamping screws 12 passed trough apertures provided for them in the bar and received in threaded apertures provided for them in the base 10. It will be observed that the other end of the bimetallic bar can move laterally in response to changes in temperature. In order to as nearly as practical distribute the fibre stresses uniformly in the thermostatic metal and thus reduce the maximum fibre stresses, the fixed end of the thermostat is made somewhat wider than the opposite or movable end. And in order to prevent curving of the thermostat in a direction at right angles to the desired movement of the bar, the thermostat is provided with a longitudinal slot which extends substantially throughout its full length; if desired this slot may extend throughout the full length of the bar. In this case, the bar actually is formed of two separate members secured by the screws 12.

An adjustment screw 13 is provided near the fixed end of the bar 11; this screw is passed through a suitable aperture provided for it in the bar and has its lower end threaded in the support 10. The adjusting screw 13, as shown, has a shoulder 13a which bears against a suitable thrust plate 14. The thrust plate 14 extends substantially the full width of the base 10 and has its opposite end portions bent downwardly at right angles to the body portion to form depanding portions 14a, these ends being retained from lateral displacement by means of suitable guide members 15 provided on the side walls 10b. It will be understood that the bimetallic bar 11 by reason of its elasticity forces the thrust plate 14, upwardly against the abutment 13a and that the thrust plate may be moved downwardly by means of the adjusting screw 13 against the elastic force of the bimetallic bar.

The movable end of the thermostat bar 11 is provided with a knife-edge bearing 16. Between this bearing and a similar bearing 17 fixedly secured to the support 10 adjacent the movable end of the bar is interposed an inverted U-shaped resilient member or spring 18. As shown, one arm of this spring has a bearing seat 20 which receives the knife-edge bearing 16 on the bar 11, while its other arm has a similar bearing seat 21 which receives the knife-edge bearing 17. The knife-edge bearings 16 and 17 are substantially parallel, and preferably they will have such a width that they will have a substantial bearing on the seats 20 and 21 provided for them in the U-shaped spring member. This arrangement serves to securely hold the member 18 in position between the bearings 16 and 17. The knife-edge bearing 17 is adjustable inwardly of the base 10. It will be observed that this bearing 17 is arranged to slide in a seat 17a provided for it in the base 10 and is secured therein by means of a pair of screws 22 (only one of which is shown) disposed on opposite sides of the bearing so that their heads overlap the edge portions of the bearing. The adjustments of the fixed pivot 17 inwardly of the spring member 18 is effected by means of an adjusting screw 23.

The bearing 17 lies in the plane of movement of the bimetallic bar 11 in such a position that at a predetermined temperature the knife-edge bearing 16 and the bar 11 will lie in a line passing through the bearing 17 to the effective point of support on the bar 11, which as will be observed is the position of the thrust plate 14. This is the neutral position of the thermostat bar. Thus, the adjusting screw 13 holds the thrust plate 14 in engagement with the adjacent side of the thermostat bar and holds the bar depressed against the resiliency of the bar so that all distortion of the bar takes place in that portion between the adjusting screw and the movable end of the thermostat. Consequently when the thrust plate 14 is held in engagement with the thermostat bar, the position of the adjusting screw is in effect the point of support of the bar so that the neutral position is defined by a line passing through the knife-edge bearing 17 and the point of engagement between the thrust plate 14 and the bar.

It will be observed that the arms of the resilient spring member 18 tends to separate by reason of the resiliency of the member, these arms being compressed between the bearings 16 and 17 whereby the member 18 exerts a force on the movable end of the thermostat, which force tends to hold the movable end on one side or the other of the neutral position. Obviously in the neutral position, the entire force exerted by the spring member 18 is in the direction of the point of support of the thermostat against the thrust plate 14. In other words, the force exerted by the spring member in the neutral position is lengthwise of the thermostat, the lateral component of this force being zero. However, when the thermostat moves from the neutral position in either direction, a lateral component of this spring pressure is produced tending to force the thermostat away from the neutral position, this lateral component increasing as the thermostat moves away from the neutral position.

Thus far the construction of the temperature control device is substantially the same as that described and claimed in the above-mentioned Simmons Patent No. 1,743,073. The switch provided for my thermostat, however, instead of being arranged as shown in the Simmons patent, preferably will comprise a substantially rigid and mechanically strong switch arm 24 which is pivotally secured to an actuating arm 25. This latter arm is rigidly secured to the central portion of the spring member 18 by means of suitable rivets 26 (only one of which is shown), a block 27 of insulating material, such as fibre, being interposed between the arm 25 and the spring member; a similar block 28 of insulating material is placed between the upper side of the spring and the rivet heads 26a.

The switch arm 24 is pivotally secured or hinged at one end to the fixed end portion of the actuating arm 25 so as to provide for a limited relative movement between these members. As shown, the switch arm 24 is provided with a button-like bearing member 30 rigidly secured to the arm on its upper surface, and received in a suitable seat 31 provided for it in the operating arm 25. It will be observed that the bearing member 30 is sufficiently long to provide for a relatively large angular movement between the switch arm 24 and its actuating arm 25. The free end of the actuating arm 25 is provided with a portion 32 projecting at right angles from the body of the arm toward the base 10. This projecting portion, as shown, is provided with an aperture 33 through which the switch arm 24 is passed so that the projecting portion embraces the intermediate portion of the switch arm. It will be observed that the aperture or slot 33 is sufficiently long to provide for a considerable angular movement between the arms 24 and 25.

A suitable tension spring 35 is provided for biasing the arms 24 and 25 together. As shown, the ends of this spring are secured to intermediate portions 24a and 25a of the bars 24 and 25 respectively. These portions as shown, are struck outwardly in opposite directions from the material forming the arms. These portions 24a, 25a need not be formed integrally with the arms 24, 25, but may be separate members secured to the arms in any suitable manner. It will be observed that the tension spring 35 tends to bias the arms together. Suitable bead-like stops 36 formed upon or otherwise suitably secured to the switch arm 24 are provided to limit the movement of the arms toward each other.

The pivoted end portion of the switch arm 24 is provided with a portion 37 projecting outwardly at right angles from the body of the arm, this portion being embraced by the actuating arm 25; as shown, the actuating arm 25 is provided with a suitable aperture 38 for receiving the projecting portion 37 of the switch arm. The projecting portion 37 in turn is provided with a portion 37a projecting at substantially right angles therefrom. It will be observed that when the arms 24 and 25 are assembled, the projecting portion 37a forms a locking tongue between the members so that while a limited angular motion is permitted between these arms, it will be impossible for the pivoted end of the switch arm to become detached.

On its free end the switch arm 24 carries a bridging contact 40 which cooperates with a set of contacts 41 (only one contact of the set being shown in Figs. 1 and 2). These contacts 41 are fixedly secured to an electrically insulating supporting member 42 secured to the base 10 by any suitable means, such as the screw fastening means 43. Each of the fixed contacts 41 is passed through a suitable aperture 44 provided for it in the insulating support 42 and is threaded for receiving a securing nut 45. Interposed between this nut and a second nut 46 arranged on the threaded end of the fixed contact is secured a suitable terminal clip 47 arranged to secure the conductor leads in position. These leads will be passed into the casing through an aperture 49 arranged in one of the walls, as for example, an end wall 10a.

Arranged on the base 10 beneath the movable end of the switch arm 24 is a suitable stop member 48 arranged to limit the motion of the thermostat mechanism toward the base. A suitable cover member 52 is secured to the base, as by means of screw fastening means 53. As shown, suitable bosses 54 are provided in the corner portions of the device for receiving the threaded ends of the fastening screws 53. The cover member 52 is provided with an aperture 55 through which the upper end portion of the adjusting screw 13 is projected whereby the adjusting screw is readily accessible on the exterior of the casing for purposes of adjustment.

The base member is provided with a plurality of apertures 56 through which suitable screw fastening means (not shown) may be passed to secure the base in thermal relation with the body whose temperature is to be controlled. Thus, for example the base may be suitably secured to the side walls of a water heating storage tank, whereby the bimetallic bar is in thermal relation with the water in the tank.

In the operation of the temperature control device, it will be understood that the fixed contacts 41 will be electrically connected in the heating circuit to be controlled, or will be connected in a suitable controlling circuit for the heating circuit to be controlled. In operation, the switch arm 24 and its actuating arm 25 are held in their upper position, as shown in Fig. 1, by the spring 18, whereby the bridging contact 40 is held in engagement with the fixed contacts 41 as long as the temperature of the device whose temperature is being controlled is below the predetermined maximum temperature for which the device is set. In the closed position of the thermostat, as viewed in Fig. 1, the arms 24 and 25 will be separated against the force exerted by the tension spring 35 to the maximum extent permitted by the aperture or slot 33. Under these conditions, the movable end of the thermostat bar 11 is situated above the neutral position, that is, above a line passing from the knife edge bearing 17 to the point of engagement between the thermostat bar and the thrust plate 14. As the temperature of the medium which influences the bimetallic bar 11 increases, the distortion of the bar tends to move its free end toward the base 10, but this movement is resisted by the resilient member 18. Upon the occurrence of the predetermined maximum temperature for which the thermostat is set, however, the thermostat overcomes the lateral component of the retarding force exerted by the spring member 18 and starts to move toward the base. As soon as the bimetallic bar thus starts to move the opposing force exerted by the spring 18 begins to decrease, and the spring 18 therefore decreasingly resists the movement of the thermostat. As a result, the thermostat rapidly accelerates and moves at a high speed through the neutral position to the opposite side thereof. As soon as the thermostat bar has passed through the neutral position, it will be observed that its movement will be assisted by the increasing lateral component of the force applied by the spring 18. This operation results in a quick opening of the fixed contacts 41, the bridging contacts 40 being thrown toward the base so as to disengage the contacts 41 with a snap action.

This snap action is further assured by the flexible connection between the switch arm 24 and its actuating arm 25. As has been pointed out, in the closed circuit position shown in Fig. 1, the switch arm 24 is separated from its actuating arm 25 to the maximum extent permitted by the slot 33. This results because the bridging contact 40 engage the fixed contacts 41 before the thermostat bar 11 has reached its normally closed circuit position for the fixed contacts 41. As a result of this arrangement, the bridging contact is held in contact with the fixed contacts 41 by means of the tension spring 35 during the initial slow movement of the thermostat, and this initial movement, therefore, is thus absorbed so that the thermostat has an opportunity to accelerate to a high speed before the upper edge of the slot 33, provided in the actuating arm 25, engages the switch arm to remove the bridging contact from the contacts 41.

When the bimetallic bar 11 has been operated to open the contacts 40, the operating arm 24 will rest against the stop 48 which limits further downward movement of the bimetallic bar. Under these conditions, as shown in Fig. 2, the tension spring 35 willl operate to hold the arms 24 and 25 together, the arm 25 as shown resting on the bead stop members 36 provided on the arm 24.

If the temperature of the medium which influences the bimetallic bar 11 begins to decrease, the distortion of the bar 11 tends to move the bridging contract 40 back to its position to close the contacts 41, but its movement is opposed as before by the force exerted by the spring member 18, until such time as the spring member 18 is overcome at some predetermined minimum temperature when the thermostat will snap to close the contacts 41.

It will be observed that when the bimetallic bar is moving from its position of Fig. 2 to its position of Fig. 1 to close the switch, the arms 24 and 25 will be in effect a single arm until the contact 40 engages the contacts 41 after which the actuating arm 25 may continue to move until the lower edge of the slot 33 engages the switch arm 24.

The loose connection between the switch arm 24 and the spring 18 possesses the further advantage that it causes the switch contacts to move into and out of engagement with a wiping action thereby preventing the accumulation of dirt or other deposits on either the bridging or the stationary contacts.

By means of the adjusting screw 13, the control device can be set to maintain a desired predetermined temperature. To set the device to maintain a higher temperature, the screw 13 is turned upwardly, whereas to decrease this temperature the screw is turned downwardly. An adjustment of the knife-edge bearing 17 provides for variations in the range between the maximum and minimum temperatures at which the circuit is opened and closed. By turning the screw 23 so as to move the bearing 17 toward the bearing 16, the force exerted by the spring 18 is increased and therefore the range is increased between the maximum temperature at which the circuit is opened and the minimum temperature at which the circuit is again closed. The movement of the bearing 17 in the opposite direction decreases this temperature range.

In Figs. 3 and 4 I have shown a modified form of my invention as applied to control the heating circuit of an electric flat iron. As shown, the flat iron comprises a comparatively heavy body member 60 made of a suitable heat conducting material, such as cast iron, within which is cast a suitable electric heating element 61. Although any suitable heating element may be used, preferably a heating element of the type described and claimed in the Abbott Patent No. 1,367,341, dated February 1, 1921 will be used. This unit comprises an outer metallic sheath 62, suitably shaped, and in which a helical resistor 63 is embedded in a suitable powdered heat refractory insulating material 64, such as magnesium oxide. The unit is shaped roughly in the form of a horse-shoe extending throughout a substantial portion of the body member 60. The terminals 65 of the heating element are brought out at the heel of the iron and are electrically connected with suitable contact pins 66 which are arranged, as is well understood by those skilled in the art, to receive the plug receptacle of a suitable supply conductor.

As shown, the upper portion of the body member 60 is enclosed by a suitable cover 67 which will be secured to the body member by some suitable means such as screws (not shown). The iron is further provided with a suitable handle 68 secured to the cover 67.

The temperature control device comprises a bimetallic thermostat bar 70 secured at one end to the body 60 by means of a clamping screw 71. The other end, that is the movable end of the bimetallic bar, is provided with a knife-edge bearing 72 which rests in a bearing seat provided for it in one arm of an inverted U-shaped resilient member or spring 73. The other arm of this spring member is seated on a fixed knife-edge bearing 74. This fixed bearing is adjustably secured to the body member 60 of the iron by means of a pair of screw members 75 disposed on opposite side of it (only one screw 75 being shown in the drawings).

A temperature adjustment rod or shaft 76 is provided, the lower end of this rod being passed through an aperture provided for it in the bimetallic bar 70 and received in threaded engagement in the body member 60. The upper end of this rod passes to the exterior of the iron through the cover member 67. To the exposed end of the rod is secured a suitable operating handle 78. The rod 76, as shown, is provided with a suitable collar 80 which bears on a suitable thrust plate 81 which in turn bears on the bimetallic bar 70.

The switch operating arm in this case comprises a substantially rigid arm 82 carrying on one end a movable or bridging contact 82a. The other end of the arm 82 is pivotally secured to the middle portion of the U-shaped spring member 73 whereby limited freedom of movement is allowed between these members. As shown, the switch arm 82 has depending therefrom a lug or ear 84 which is received in a suitable aperture provided for it in the middle portion of the spring member 73 so that it projects through the spring member to the under side thereof. The portion projecting under the spring member is provided with an aperture through which a suitable retaining pin 85 is passed and secured to prevent vertical displacement of the switch arm.

The switch arm 82 is provided with a second depending lug 86, this lug being passed through an aperture provided for it in the forward end of the middle portion of the U-shaped spring member and having on its under side a locking abutment 87. The portion of the lug 86 between the switch arm 82 and the abutment 87, as shown, is somewhat longer than the lug 84 so as to provide for some pivotal movement between the switch arm and the spring member. The switch arm is normally biased toward the spring member by means of a tension spring 88 having one end secured to the lug 86 and extending diagonally across the spring member to the other side when its other end is secured to a suitable lug 89 provided on the spring member.

The movable contact 82a cooperates with suitable fixed contacts 83 rigidly secured to the base 60 of the iron. It will be understood that the fixed contacts 83 will be suitably insulated from the base 10.

The bridging contact 82a, as shown, is secured to the contact arm 82 by means of an eyelet 90, a suitable sheet 91 of insulating material, such as mica, being interposed between the arm 82 and the bridging contact member. Arranged on the other side of the contact arm 82 is a similar sheet 91a of insulating material and on this is placed a suitable metallic sheet 92 of material 92. The end portions 82b of the bridging contact member, as shown (Figs. 5 and 6) are bent upwardly and about the mica insulating sheets, the switch member 82 and the metallic sheet 92 so as to clamp these members togther and to secure the contact member 82a to the switch arm.

In the operation of the control device, the bridging contact 82a will be held in engagement with the fixed contacts 83 to maintain the heating circuit closed, as shown in Fig. 3, as long as the temperature of the heating plate 60 is below a predetermined maximum value. Under this condition, the movable end of the thermostat is situated below its neutral position. As the temperature increases the distortion of the thermostat tends to move its free end upward. This motion is resisted by the operation of the resilient member 73 until the occurrence of a predetermined maximum temperature, whereupon the thermostat has sufficient force to overcome the spring and it starts to move upwardly. As the thermostat moves upwardly, the spring 73 decreasingly resists its motion, with the result that the thermostat rapidly accelerates and moves at a high speed through its neutral position to the opposite side thereof, where it is urged rapidly upward by the increasing lateral component of force applied by the spring 73. The heating circuit is thus quickly opened, the bridging contact 82a being thrown upward with a snap action to its position shown in Fig. 4. This snap action is further assured by the flexible connection between the switch operating arm 82 and the resilient spring member 73. Thus, it will be observed that the initial slow retarded motion of the bimetallic bar 70 is absorbed by the loose connection between the arm 82 and the spring before the arm 82 is engaged by the spring to open the switch contacts. In other words, the loose connection between the switch arm 82 and the spring member 73 will be such that the bimetallic bar will have an opportunity to accelerate to a high speed before the switch arm is engaged to open the contacts.

After the heating circuit has been opened and the temperature of the device and consequently the temperature of the thermostat begins to decrease the thermostat tends to move back to its closed circuit position. Its movement in this direction is opposed by the force exerted by the spring member 73, this force being overcome at some predetermined minimum temperature when the thermostat will snap to close the switch.

During the closing movement the bridging contact 82a will engage the stationary contacts 83 somewhat before the bimetallic bar has been moved to its closed circuit position shown in Fig. 3, further movement of the bimetallic bar being permitted by the loose connection provided between the switch arm 82 and the spring member 73.

The loose connection between the arm 82 and the spring 73 also has the advantage that it causes the contacts to move into and out of engagement with a wiping action thereby preventing the accumulation of dirt or other deposits on either the movable or the stationary contacts.

The temperature setting of the control device is adjusted by means of the rod 76, whereas the range between the maximum temperature at which the circuit is opened and the minimum temperature at which it is closed is adjusted by means of the fixed bearing member 74.

This form of my invention shown in Figs. 3-6 inclusive is described and claimed in my copending application Serial No. 725,339, filed May 12, 1934, and which application is a division of the instant application.

In the forms of my invention shown in Figs. 7-11 inclusive, I provide a different arrangement for changing the temperature setting of the temperature control device, the structures of the devices shown in these figures being otherwise substantially the same as those shown in Figs. 1-6 inclusive. The temperature control devices of these Figures 7-11 are shown as applied to arrangements particularly useful in connection with hot water heating systems wherein means are provided for immersing the temperature responsive elements.

Referring more particularly to Figs. 7, 8 and 9, the bimetallic temperature responsive bar 100 is secured at one end to a supporting block 101 rigidly secured to the lower end, as viewed in the figures, of a tubular receptacle 102. This receptacle it will be understood is arranged to be inserted through a suitable aperature provided for it in a hot water tank so that the tube will be immersed in the liquid being heated.

The upper end of the bimetallic bar emerges from the mouth of the tubular member 102 and extends into a suitable receptacle 103. This receptacle is defined by a base member 104 which is secured to the upper end of the tube 102 and a casing member 105 cooperating with the base to define the chamber 103. The upper end of the bimetallic bar is provided with a knife-edge bearing fitted in a seat provided for it in one arm of a U-shaped spring member 106, the other arm of which is provided with a bearing seat receiving a fixed knife-edge bearing 107. As shown, the knife-edge bearing 107 is secured to a yoke member 108, a suitable seat being provided in the yoke member for receiving the knife-edge bearing. Screws 109 are provided on opposite sides of the bearing 107 for securing it to the yoke. A screw 110 is provided for adjusting the tension of the U-shaped spring member 106.

The yoke member 108 is pivotally mounted in suitable bearings 111 provided for it on the base 104. These bearings as shown are disposed on opposite sides of the mouth of the tube 102 and preferably will be so arranged that the yoke will swing on an axis substantially parallel with the bearing faces of the knife-edges of the bimetallic bearing and the bearing 107, and coincident with the axis of the bearing 111 in one of its positions, as shown in Fig. 8.

Suitable means is provided for adjusting the position of the yoke member so as to adjust the position of the fixed pivot 107 and hence the position of the spring 106 relatively to the bimetallic bar. This adjusting means comprises a suitable cam-like member 112 arranged on an adjusting screw or shaft 113.

As shown, the lower end of this shaft is threaded into a boss 114 provided for it on the base 104. From this boss the shaft extends vertically and passes through an aperture provided for it in the casing 105 to the exterior of the casing where an operating knob 115 is provided. The cam member 112 is arranged to bear against a suitable adjustable screw abutment 116 threaded into and supported by the yoke 108. The yoke 108 is biased toward the right, as shown in the figures, so as to cause the abutment 116 to bear against the cam 112. For this purpose, I have provided a suitable compression spring 117 having one end bearing against the upper end of the yoke 108 and its opposite end bearing against a fixed abutment or support 118. As shown, the member 118 is provided with a projecting portion arranged to be inserted in this latter end of the spring 117, whereas the yoke 108 is provided with a cup-like retaining member 120 surrounding its end of the spring. It will be observed that by reason of the foregoing arrangement the position of the yoke can be adjusted merely by turning the knob 115.

Mounted on the U-shaped spring member 106 is a suitable switch arm 121 carrying a bridging contact 122 arranged to cooperate with suitable fixed contacts 123 carried by the supporting member 118. The switch arm 121 is formed from some suitable electrically insulating material, such as a phenol condensation product. The bridging contact arm 122, like the bridging contact arms of the devices shown in Figs. 1–6 inclusive, is arranged for relative movement with respect to its supporting U-shaped spring member 106. The member 121 is connected to the U-shaped spring 106 through the medium of an arm 124 rigidly secured to the central portion of this spring member. A suitable spring connection is interposed between the arms 121 and 124. This connection, as shown, comprises a stud-like member 125 having one end passed through an aperture provided for it in the switch arm 121 and rigidly secured to the arm 124. Interposed between the head of this stud and the switch arm 121 is a suitable compression spring 126.

These parts are so arranged that when the switch is in its closed position as shown in Fig. 8 the bimetallic bar 100 will be allowed to move somewhat in its switch opening direction before the contact arm 121 is actuated to disengage the bridging and fixed contacts. Thus, the initial slow motion of the thermostat is absorbed and the thermostat is allowed to accelerate to a considerable speed before the switch contacts will be opened.

The supporting member 118, as shown is formed of some suitable electrically insulating material, such as molded bakelite and is supported on bosses 128 provided for it on the base 104. Screw fastening means 129 are provided to secure the member 118 to its base. The fixed contacts 123 extend through this supporting member 118 and on their upper ends are provided with suitable terminal clips 130 which may be connected in the circuit which is to be controlled or in the controlling circuit for the circuit which is to be controlled. The casing is provided with a suitable bushing 131 through which the conductors of the controlled circuit are passed for connection with the terminal clips 130.

The temperature control device of Figs. 7, 8 and 9, operates in substantially the same manner as do the temperature control devices shown in Figs. 1–6 inclusive, and so it is believed that it will be unnecessary to describe this operation in detail at this point.

However, to adjust the device of Figs. 7, 8 and 9, to maintain various predetermined temperatures, the fixed pivot 107 is moved to change the position of the spring 106 relative to the bimetallic bar, rather than by changing the curvature of the bimetallic bar itself as is the case in Figs. 1–6 inclusive. It will be observed that when the knob 115 is rotated, the position of the yoke 108 and hence the position of the fixed knife-edge bearing 107 is changed. This obviously changes the position of the neutral line which passes between the fixed knife-edge bearing 107 and the point of support of the fixed end of bimetallic bar 100. It will be obvious that by changing the position of this neutral line the temperature at which the thermostat will snap from one position to the other likewise will be changed. To set the device to maintain a higher temperature, the knob 115 will be turned so as to allow yoke 108 to move in a clockwise direction, as viewed in the Figs. 8 and 9. Adjustment of the yoke in the opposite direction will decrease the temperature that will be maintained. An adjustment of the knife-edge bearing 107 to vary the tension of the U-shaped spring 106 changes the range between the maximum and the minimum temperatures at which the circuit is opened and closed by the device.

The modification shown in Figs. 10 and 11 is substantially the same in structure and operation as is the form shown in Figs. 7, 8 and 9 with the exception of the means provided for moving the yoke which supports the fixed knife-edge bearing for the U-shaped spring member and with the exception of slight changes in the means for supporting the switch actuating arm.

As shown (Figs. 10 and 11), the bimetallic bar 130 of this form is secured at its lower end in a suitable tubular member 131 and projects from the tube into a suitable casing 132. The projecting end bears on one arm of a U-shaped spring member 133. The other arm of this spring member, as shown, bears on a fixed knife-edge bearing 134 carried by the yoke member 135. This yoke member, as shown, is pivotally mounted in suitable bearings 136 provided on the base 137 of the casing. The yoke is adjusted by means of screw means comprising a shaft or rod 138 vertically supported on the base 137 and provided at its lower end with a worm 140. This worm meshes with an arcuate rack 141 provided on one arm of the yoke 135. This rod projects from the casing 132 and is provided with a slot 135a whereby adjustment from the exterior of the casing may be effected. It will be obvious that by turning this screw in one direction or the other, the position of the yoke 135 and hence the position of the knife-edge bearing 134 will be changed. This adjustment, as has been explained in the discussion of the form shown in Figs. 7, 8 and 9, changes the position of the U-shaped spring 133 relative to the bimetallic member 130 and hence changes the temperature setting of the thermostat. It will be understood that the screw connection between the member 138 and the yoke 135 serves to support the yoke in its adjusted position.

The bridging contact 142 in this case is carried by an arm 143 which is flexibly connected with an actuating arm 144 in substantially the same manner as are the arms 121 and 124 of the device shown in Figs. 7, 8 and 9. The arm 144 in this case, however, is not connected to the mid-portion of its actuating U-shaped spring member as is the arm 124 of Figs. 7, 8 and 9, but is connected on the inner side of one of the legs of this member. As shown, this arm is connected to the inner side of the leg bearing on the fixed pivot 134. The bridging contact 142 cooperates with fixed contacts 145 secured to a suitable electrically insulating supporting member 146 which in turn is supported on the base 137. It will be understood that these fixed contacts will be connected in the circuit to be controlled or in a controlling circuit for the circuit to be controlled.

The operation of this form of my invention is susbtantially the same as is the operation of the forms shown in Figs. 1-6 inclusive and it is believed to be unnecessary to describe in detail the operation at this point.

The forms of my invention shown in Figs. 7-11 inclusive are described and claimed in my copending application Serial No. 725,338, filed May 12, 1934 and which application is a division of the instant application.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A temperature control device comprising a thermostat bar, a U-shaped spring member having one arm bearing on said bar so as to cause said bar to move quickly from one position to another, a substantially rigid control arm actuated by said thermostat bar, a second substantially rigid arm secured to the base of said U-shaped spring member, a pivotal connection joining said control arm to said second arm, a spring having one end connected to said control arm and its other end connected to said second arm so as to bias said arms together and means carried by said arms for engaging each other so as to limit the extent said arms can be moved toward and away from each other.

2. A temperature control device comprising a support, a thermostat bar secured to said support, a U-spring having one end bearing on said bar so as to cause said bar to move quickly between its controlling positions, a switch arm, a rigid arm rigidly secured to said base of said U-spring, a bearing carried by said switch arm received in a bearing seat provided for it in said rigid arm arranged so that said switch arm is held in spaced relation with said rigid arm and can be moved on its bearing with reference to said rigid arm, means on said switch arm and said rigid arm engaging said arms to limit the movement of said arms relative to each other and a spring connecting said arms so as to bias said switch arms in one direction relative to said rigid arm.

3. A temperature control device comprising a support, a thermostat, a U-shaped spring member having one arm bearing on a pivot and its other arm bearing on said thermostat so as to cause said thermostat to move quickly from one position to another, a control member and means pivotally connecting said control member with the central portion of said U-shaped spring member comprising an arm rigidly secured to said spring member, said arm being provided with an aperture through which said control member is passed and having such dimensions that said control member has limited relative movement with respect to said arm away from and toward said arm to predetermined positions, means providing for pivotal movement of said control member with respect to said arm and a spring connecting said arm and said control member biasing said arm to one of said predetermined positions.

FRANCIS H. McCORMICK.